United States Patent
Schmidt et al.

(10) Patent No.: US 9,124,201 B2
(45) Date of Patent: Sep. 1, 2015

(54) METHOD AND DEVICE FOR CONTROLLING AN ELECTRIC MACHINE

(71) Applicants: Matthias Schmidt, Stuttgart (DE); Christoph Benz, Uhingen (DE)

(72) Inventors: Matthias Schmidt, Stuttgart (DE); Christoph Benz, Uhingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 76 days.

(21) Appl. No.: 13/771,981

(22) Filed: Feb. 20, 2013

(65) Prior Publication Data
US 2013/0214707 A1    Aug. 22, 2013

(30) Foreign Application Priority Data
Feb. 21, 2012   (DE) .......................... 10 2012 202 647

(51) Int. Cl.
| | |
|---|---|
| H02P 3/00 | (2006.01) |
| H02P 29/04 | (2006.01) |
| H02P 3/06 | (2006.01) |
| B60L 7/18 | (2006.01) |
| B60L 7/26 | (2006.01) |
| B60W 30/18 | (2012.01) |
| B60W 10/08 | (2006.01) |

(52) U.S. Cl.
CPC ... *H02P 3/06* (2013.01); *B60L 7/18* (2013.01); *B60L 7/26* (2013.01); *B60W 30/18127* (2013.01); *B60L 2250/24* (2013.01); *B60L 2250/26* (2013.01); *B60L 2250/28* (2013.01); *B60L 2260/24* (2013.01); *B60L 2260/30* (2013.01); *B60W 10/08* (2013.01); *B60W 2540/10* (2013.01); *B60W 2540/12* (2013.01); *Y02T 10/642* (2013.01)

(58) Field of Classification Search
CPC ................ H02P 3/12; H02P 6/24; H02P 3/22
USPC ..................................... 318/375, 362
See application file for complete search history.

(56) References Cited

U.S. PATENT DOCUMENTS

| | | | |
|---|---|---|---|
| 2002/0079853 A1* | 6/2002 | Schmitz et al. ............... | 318/434 |
| 2004/0245947 A1* | 12/2004 | Wilton et al. ................. | 318/139 |
| 2009/0026987 A1* | 1/2009 | Takahashi ..................... | 318/376 |

FOREIGN PATENT DOCUMENTS

| | | |
|---|---|---|
| DE | 102004025830 | 8/2006 |
| DE | 10 2007 035 424 | 1/2009 |
| DE | 102009021662 | 11/2010 |
| DE | 102010039041 | 2/2012 |
| DE | 10 2010 041 997 | 4/2012 |
| WO | 2011072987 | 6/2011 |

* cited by examiner

*Primary Examiner* — Eduardo Colon Santana
*Assistant Examiner* — Gabriel Agared
(74) *Attorney, Agent, or Firm* — Kenyon & Kenyon LLP

(57) ABSTRACT

In a method for predefining a generator-based braking power of an electric machine in a vehicle, a motor-based propulsion power is predefined as a function of the position of a first final control element, e.g., an accelerator pedal, and the generator-based braking power is predefined as a function of the position of the first final control element, the generator-based braking power assuming values which are unequal to zero, already at an actuated position of the first final control element.

24 Claims, 2 Drawing Sheets

METHOD AND DEVICE FOR CONTROLLING AN ELECTRIC MACHINE

BACKGROUND OF THE INVENTION

1. Field of the Invention

The present invention relates to a method and a device for predefining a generator-based braking power of an electric machine in a vehicle.

2. Description of Related Art

In the drive train of a vehicle, a torque or a power output is usually adjusted as a function of driver input. This driver input is detected by final control elements, e.g., an accelerator pedal and a brake pedal.

A propulsion power, which is generated by an internal combustion engine, for example, may be predefined by a first final control element, the accelerator pedal, for example.

A friction braking power, i.e., the power which is generated by a friction brake, is predefined by a second final control element, the brake pedal, for example. The friction brake may be provided by a hydraulic braking system, for example.

If a generator having adequate power is installed in the drive train, the question arises as to how the braking power generated by the generator is selected as simply as possible, but also for the driver as comfortably as possible, as a function of the positions of the final control elements.

A method for operating a generator in a regenerative system of a motor vehicle is described in German patent application document DE 10 2010 041 997 (which is not believed to be prior art with respect to the present application), in which an accelerator pedal angle of an accelerator pedal of the motor vehicle is detected and a power output or a torque of the generator is adjusted as a function of the detected accelerator pedal angle.

BRIEF SUMMARY OF THE INVENTION

The present invention provides a method for predefining a generator-based braking power of an electric machine in a vehicle, a computer program to carry out the method according to the present invention, an electrical storage medium for a control and/or regulating unit of the electric machine, on which this computer program is stored, as well as a control and/or regulating unit of an electric machine which is programmed in such a way that it is able to carry out all steps of the method according to the present invention.

One method is particularly advantageous for predefining a generator-based braking power of an electric machine in a vehicle, in which a motor-based propulsion power is predefinable as a function of the position of a first final control element, in particular an accelerator pedal, when the generator-based braking power is also predefined as a function of the position of the first final control element, the generator-based braking power assuming values which are unequal to zero, already in the case of an actuated position of the first final control element. In this case, a motor-based propulsion power, which acts as an accelerator, and a generator-based braking power, which acts as a decelerator, may both be adjusted by a single final control element.

If the generator-based braking power is predefined as a function of the position of the first final control element in such a way that it only assumes values which are smaller than a neutral generator-based braking power, in particular smaller than a first predefinable portion of a maximum generator-based braking power, it is thus possible to particularly easily prevent the driver's feedback from changing too much as a function of the maximum generator-based braking power which, in particular, depends on the state of charge of a battery or on the temperature, but also on an instantaneous capacity of the battery. The neutral generator-based braking power is in this case understood as the generator-based braking power which is requested when none of the final control elements is actuated.

It is particularly advantageous that both the motor-based propulsion power and the generator-based braking power are predefined to be zero in a range of positions of the first final control element. This may, for example, be predefined in such a way that only in the case of positions of the first final control element which are greater than a motor-based zero path, a motor-based propulsion power which is greater than zero is predefined, and only in the case of positions of the first final control element which are smaller than a generator-based zero path, a generator-based braking power which is greater than zero is predefined, the motor-based zero path being selected to be greater than the generator-based zero path. In this way, the driver input may be metered in a more improved manner, in particular in this range of low motor-based propulsion power or low generator-based braking power. For this purpose, it is possible to select this range to be arbitrarily small, in particular zero.

It is particularly advantageous that the generator-based braking power is also predefined as a function of the position of a second final control element, in particular a brake pedal, with the aid of which a friction braking power is predefinable. In this case, the generator-based braking power is easily predefinable in a wide range of driver inputs.

It is particularly advantageous that the generator-based braking power assumes, as a function of the position of the second final control element, only values which are not smaller than the neutral generator-based braking power, in particular than the first predefinable portion of the maximum generator-based braking power. In this way, it is namely possible to carry out the formation of the curve of the generator-based braking power as a function of the positions of the first and the second final control elements in a particularly simple, and for the driver manageable, manner.

It is furthermore advantageous that the generator-based braking power is selected to be proportional to the friction braking power at positions of the second final control element greater than a free travel. In this case, the braking sensation is namely essentially independent of the maximum generator-based braking power possible at this very moment, and the braking sensation which is changed by the generator-based braking power is very similar to the braking sensation in the case of a pure friction braking power.

It is furthermore advantageous that, in the case of a not-actuated first final control element and in the case of positions of the second final control element which are not greater than the free travel, the generator-based braking power assumes values which are greater than a second predefinable portion of the difference between the maximum generator-based braking power and the neutral generator-based braking power, these being possibly provided, in particular, by the product of the maximum generator-based braking torque and the first predefinable portion.

In another preferred embodiment, the generator-based braking power is predefined in such a way that, in the case of a not-actuated first final control element and in the case of positions of the second final control element which are not greater than the free travel, it assumes values which are greater than a second predefinable portion of the difference between the maximum generator-based braking power and the neutral generator-based braking power, in particular the product of the maximum generator-based braking torque and the first predefinable portion. This means that a first predefinable portion of the maximum generator-based braking power is adjusted with the aid of the first final control element, and, of the remaining adjustable generator-based braking power, a second predefinable portion is subsequently readjusted within the free travel of the second final control element. This separation results in the braking sensation not significantly changing when the maximum generator-based braking power changes.

In the following, the special case always involves the accelerator pedal as the first final control element and the brake pedal as the second final control element. However, it is of course possible to also provide other final control elements instead of the first and/or the second final control element(s), e.g., levers or other manually operable final control elements. It is also possible to equivalently replace the variables, which are represented in the following as well as previously as a physical variable of a power, with the variable of a torque.

The formation of the generator-based braking power as a function of the position of the accelerator pedal is independent of the formation of the generator-based braking power as a function of the brake pedal. It is, however, advantageous that a constant transition of the two functions into one another is ensured.

It is thus conceivable to only adopt the formation of the generator-based braking power as a function of the accelerator pedal position or the brake pedal position.

DETAILED DESCRIPTION OF THE INVENTION

The detected actuating positions of accelerator pedal wPed and brake pedal BPed do not necessarily have to correspond to the actual actuations. It is, for example, possible that a safety function provides in the case of simultaneous actuation of the accelerator pedal and the brake pedal that the position of the accelerator pedal "overrules" the position of the brake pedal or also that the position of the brake pedal "overrules" the position of the accelerator pedal. The actually ascertained position of accelerator pedal wPed would be zero, for example, in the latter case, if the accelerator pedal and the brake pedal were actuated strongly at the same time.

Figure 1:
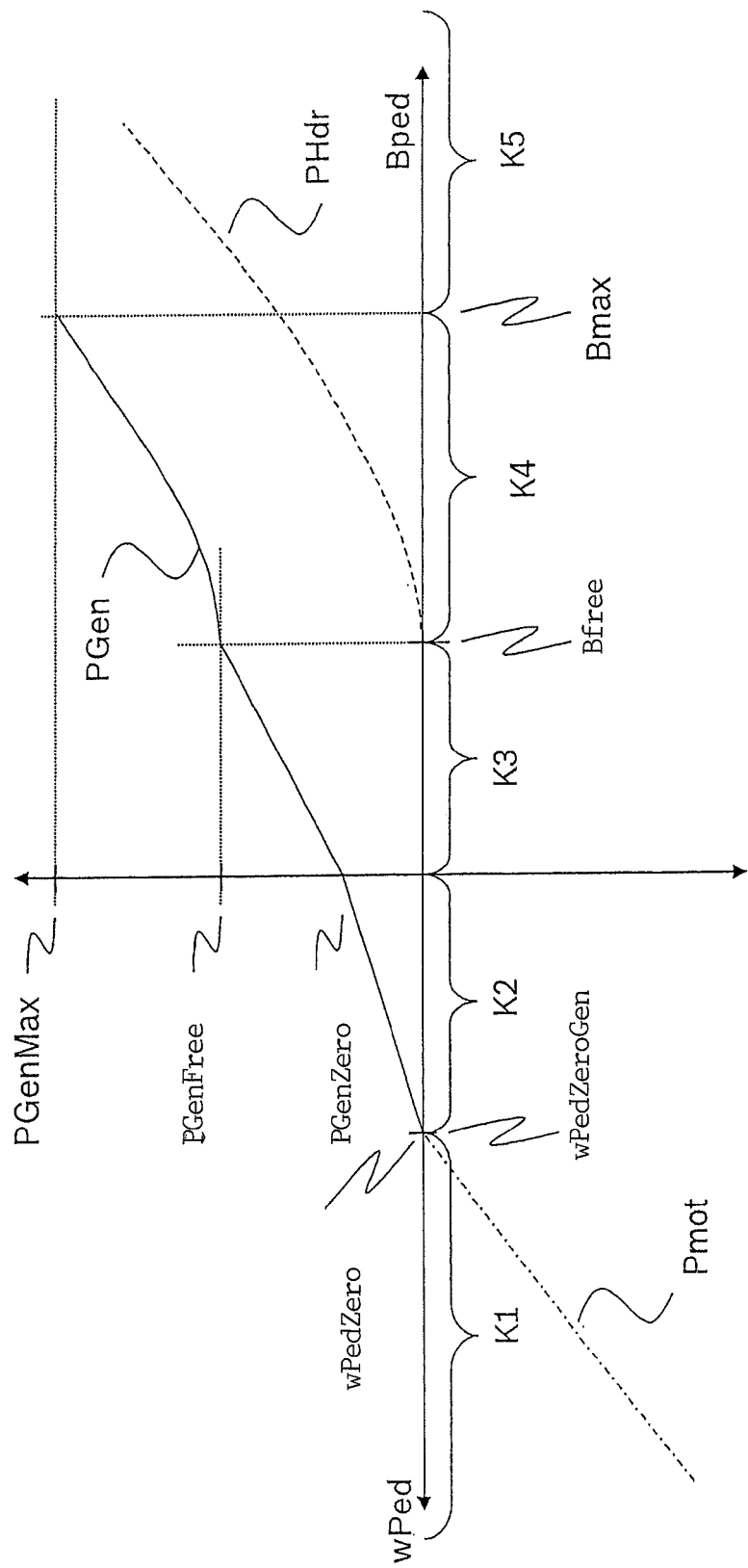
FIG. 1 shows a preferred curve of the generator-based braking power of the electric machine as a function of the positions of accelerator pedal wPed and brake pedal BPed.

FIG. 1 shows on the ordinate braking powers going up and propulsion powers going down, and on the abscissa the position of accelerator pedal wPed going left and the position of brake pedal BPed going right. As long as a simultaneous actuation of the accelerator pedal and the brake pedal does not occur, it is thus possible to clearly assign a position on the abscissa to the position of accelerator pedal wPed and brake pedal BPed. In the case of a safety function as mentioned above, this safety function may provide that an unambiguous position on the abscissa is assigned to any position of accelerator pedal wPed and brake pedal BPed. In the following, it is always assumed that accelerator pedal position wPed and the position of brake pedal BPed represent ascertained values, after such a safety function has corrected the detected values.

FIG. 1 shows motor-based propulsion power Pmot, generator-based braking power PGen, and friction braking power PHdr. As position wPed of the accelerator pedal drops, motor-based propulsion power Pmot drops down to a motor-based zero path wPedZero. This decrease is plotted linearly in FIG. 1 but it may assume any other monotonically decreasing curve. Motor-based zero path wPedZero is thus position wPed of the accelerator pedal in which motor-based propulsion power Pmot has dropped to zero. If positions wPed of the accelerator pedal are greater than motor-based zero path wPedZero, generator-based braking power PGen is selected to be equal to zero. In the case of positions wPed of the accelerator pedal which are smaller than motor-based zero path wPedZero, generator-based braking power PGen increases linearly, as position wPed of the accelerator pedal drops, until it assumes a neutral generator-based braking power PGenZero in the case of a neutral position of the accelerator pedal, i.e., in the case of accelerator pedal position wPed being equal to zero.

It is possible to predefine the value of neutral generator-based braking power PGenZero; it is, however, also possible to predefine the quotient, e.g. as 30%, on neutral generator-based braking power PGenZero and maximum generator-based braking power PGenMax. The latter case thus means that, after motor-based propulsion power Pmot has dropped to zero, 30% of the maximum generator-based braking power could be regulated and/or controlled with the aid of position wPed of the accelerator pedal. The linear relationship between position wPed of the accelerator pedal and generator-based braking power PGen is not necessarily required. An arbitrary strictly monotonically decreasing relationship is possible.

Likewise or alternatively, it is also possible to not change the gradient of the relationship between position wPed of the accelerator pedal and the generator-based braking power when neutral generator-based braking power PGenZero changes (e.g., because it is selected to be proportional to maximum generator-based braking power PGenMax). It is possible in this case to variably establish generator-based zero path wPedZeroGen and, if necessary, also motor-based [zero path] wPedZero as a function of neutral generator-based braking power PGenZero and/or as a function of maximum generator-based braking power PGenMax. It is particularly advantageous to select generator-based zero path wPedZeroGen and/or motor-based zero path wPedZero to be monotonically increasing, e.g. linearly increasing, having a neutral generator-based braking power PGenZero and/or maximum generator-based braking power PGenMax.

If the accelerator pedal is not actuated, but the brake pedal is actuated instead, generator-based braking power PGen increases from neutral generator-based braking power PGenZero, in the case of neutral position BPed being equal to zero of the brake pedal, to a predefinable value which is a so-called free travel generator-based braking power MGenFree in the case of free travel Bfree of brake pedal position BPed. In the case of brake pedal positions BPed which are smaller than free travel Bfree, a friction braking power is not requested, i.e., the hydraulic braking system does not brake yet, for example.

Starting from brake pedal positions BPed which are greater or equal to free travel Bfree, a friction braking power is requested, i.e., the hydraulic braking system brakes, for example. In the case of a hydraulic braking system, this point is provided by the start of a hydraulic pressure build-up in the brake master cylinder.

It is possible to predefine free travel generator-based braking power PGenFree; it is also possible to predefine the difference from free travel generator-based braking power PGenFree and neutral generator-based braking power PGen- Zero; and it is particularly preferred to predefine the quotient from the difference between free travel generator-based braking power PGenFree, neutral generator-based braking power PGenZero, and maximum generator-based braking power PGenMax, i.e., quotient (PGenFree−PGenZero)/PGenMax is predefined, e.g., as 35%.

In the exemplary embodiment illustrated in FIG. 1, the generator-based braking power PGen linearly increases in this range as a function of brake pedal position BPed. However, any other strictly monotonically increasing relationships are also possible.

If brake pedal position BPed exceeds free travel Bfree, friction braking power PHdr increases in a manner which is characteristic of the braking system.

Now, it is preferably provided that the further increase of generator-based braking power PGen is selected to be proportional to friction braking power PHdr, in particular until generator-based braking power PGen reaches maximum generator-based braking power PGenMax in a maximum path Bmax of brake pedal position BPed. In the case of brake pedal positions which are greater than maximum path Bmax, generator-based braking power PGen is advantageously selected to be constantly identical to maximum generator-based braking power PGenMax.

Figure 2:
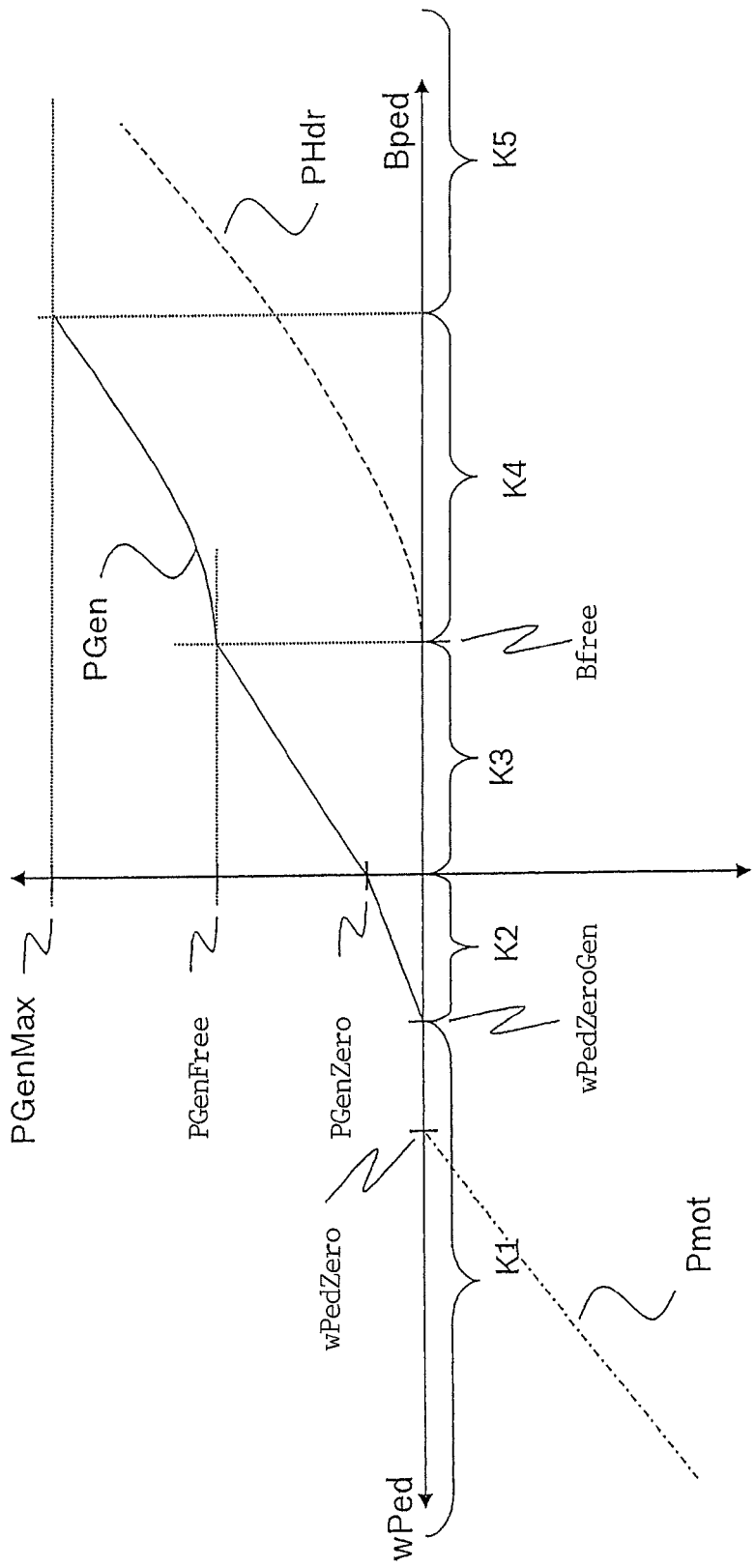
FIG. 2 shows a second preferred specific embodiment of the curve of the generator-based braking power of the electric machine as a function of the positions of accelerator pedal wPed and brake pedal BPed.

FIG. 2 shows an alternative specific embodiment which is largely identical to the specific embodiment illustrated in FIG. 1. Only the differences are described in the following. In the specific embodiment illustrated in FIG. 2, a plateau range is provided between motor-based zero path wPedZero and generator-based zero path wPedGen of accelerator pedal position wPed. If accelerator pedal position wPed is in the range between generator-based zero path wPedZeroGen and motor-based zero path wPedZero, neither a motor-based propulsion power Pmot nor a generator-based braking power PGen is thus requested, thereby improving the metering ability in this range.

The implementation of generator-based braking power PGen thus determined by the control and/or regulating unit is usually carried out by a control and/or regulating unit of the electric machine, e.g., by accordingly controlling a field current or by a suitably clocked control of rectifying components.

What is claimed is:

1. A method for predefining a generator-based braking power of an electric machine in a vehicle, comprising:
predefining a motor-based propulsion power as a function of the position of a first final control element in the form of an accelerator pedal; and
predefining the generator-based braking power as a function of the position of the first final control element, the generator-based braking power assuming values which are unequal to zero, already at an actuated position of the first final control element;
wherein the generator-based braking power, as a function of the position of the first final control element, only assumes values which are smaller than a neutral generator-based braking power and smaller than a first predefined percentage of a maximum generator-based braking power,
wherein the generator-based braking power is also predefined as a function of the position of a second final control element in the form of a brake pedal, and wherein a friction braking power is predefined with the aid of the brake pedal, and
wherein the generator-based braking power, as a function of the position of the second final control element, only assumes values which are not smaller than the neutral generator-based braking power and not smaller than the first predefined percentage of the maximum generator-based braking power.

2. The method as recited in claim 1, wherein the generator-based braking power is selected to be proportional to the friction braking power at positions of the second final control element greater than a free travel.

3. The method as recited in claim 2, wherein, in the case of a not-actuated first final control element and in the case of positions of the second final control element which are not greater than the free travel, the generator-based braking power assumes values which are greater than a predefined percentage of a difference between the maximum generator-based braking power and the neutral generator-based braking power.

4. The method as recited in claim 1, wherein in a range of positions of the first final control element which are smaller than a motor-based zero path and not smaller than a generator-based zero path, both the motor-based propulsion power and the generator-based braking torque are predefined to be zero.

5. The method as recited in claim 4, wherein in the case of positions of the first final control element which are greater than the motor-based zero path, the motor-based propulsion power is predefined to be greater than zero.

6. The method as recited in claim 5, wherein at least one of the generator-based zero path and the motor-based zero path is selected as a function of at least one of the maximum generator-based braking power and the neutral generator-based braking power.

7. The method as recited in claim 4, wherein in the case of positions of the first final control element which are smaller than the generator-based zero path, a generator-based braking torque is predefined to be greater than zero.

8. A non-transitory computer-readable data storage medium storing a computer program having program codes, which is executable on a computer, comprising:
a program code arrangement having program code for predefining a generator-based braking power of an electric machine in a vehicle, by performing the following:
predefining a motor-based propulsion power as a function of the position of a first final control element in the form of an accelerator pedal; and
predefining the generator-based braking power as a function of the position of the first final control element, the generator-based braking power assuming values which are unequal to zero, already at an actuated position of the first final control element;
wherein the generator-based braking power, as a function of the position of the first final control element, only assumes values which are smaller than a neutral generator-based braking power and smaller than a first predefined percentage of a maximum generator-based braking power;
wherein the generator-based braking power, as a function of the position of the first final control element, only assumes values which are smaller than a neutral generator-based braking power and smaller than a first predefined percentage of a maximum generator-based braking power,
wherein the generator-based braking power is also predefined as a function of the position of a second final control element in the form of a brake pedal, and wherein a friction braking power is predefined with the aid of the brake pedal, and
wherein the generator-based braking power, as a function of the position of the second final control element, only assumes values which are not smaller than the neutral generator-based braking power and not smaller than the first predefined percentage of the maximum generator-based braking power.

9. The storage medium as recited in claim 8, wherein in a range of positions of the first final control element which are smaller than a motor-based zero path and not smaller than a generator-based zero path, both the motor-based propulsion power and the generator-based braking torque are predefined to be zero.

10. The storage medium as recited in claim 9, wherein in the case of positions of the first final control element which are greater than the motor-based zero path, the motor-based propulsion power is predefined to be greater than zero.

11. The storage medium as recited in claim 10, wherein at least one of the generator-based zero path and the motor-based zero path is selected as a function of at least one of the maximum generator-based braking power and the neutral generator-based braking power.

12. The storage medium as recited in claim 9, wherein in the case of positions of the first final control element which are smaller than the generator-based zero path, a generator-based braking torque is predefined to be greater than zero.

13. The storage medium as recited in claim 8, wherein the generator-based braking power is selected to be proportional to the friction braking power at positions of the second final control element greater than a free travel.

14. The storage medium as recited in claim 13, wherein, in the case of a not-actuated first final control element and in the case of positions of the second final control element which are not greater than the free travel, the generator-based braking power assumes values which are greater than a predefined percentage of a difference between the maximum generator-based braking power and the neutral generator-based braking power.

15. A control unit of an electric machine, comprising:
a predefining arrangement for predefining a motor-based propulsion power as a function of the position of a first final control element in the form of an accelerator pedal, and for predefining the generator-based braking power as a function of the position of the first final control element, the generator-based braking power assuming values which are unequal to zero, already at an actuated position of the first final control element;
wherein the generator-based braking power, as a function of the position of the first final control element, only assumes values which are smaller than a neutral generator-based braking power and smaller than a first predefined percentage of a maximum generator-based braking power,
wherein the generator-based braking power is also predefined as a function of the position of a second final control element in the form of a brake pedal, and wherein a friction braking power is predefined with the aid of the brake pedal, and
wherein the generator-based braking power, as a function of the position of the second final control element, only assumes values which are not smaller than the neutral generator-based braking power and not smaller than the first predefined percentage of the maximum generator-based braking power.

16. The control unit as recited in claim 15, wherein in a range of positions of the first final control element which are smaller than a motor-based zero path and not smaller than a generator-based zero path, both the motor-based propulsion power and the generator-based braking torque are predefined to be zero.

17. The control unit as recited in claim 16, wherein in the case of positions of the first final control element which are greater than the motor-based zero path, the motor-based propulsion power is predefined to be greater than zero.

18. The control unit as recited in claim 17, wherein at least one of the generator-based zero path and the motor-based zero path is selected as a function of at least one of the maximum generator-based braking power and the neutral generator-based braking power.

19. The control unit as recited in claim 16, wherein in the case of positions of the first final control element which are smaller than the generator-based zero path, a generator-based braking torque is predefined to be greater than zero.

20. The control unit as recited in claim 15, wherein the generator-based braking power is also predefined as a function of the position of a second final control element in the form of a brake pedal, and wherein a friction braking power is predefined with the aid of the brake pedal.

21. The control unit as recited in claim 15, wherein the generator-based braking power is selected to be proportional to the friction braking power at positions of the second final control element greater than a free travel.

22. The control unit as recited in claim 21, wherein, in the case of a not-actuated first final control element and in the case of positions of the second final control element which are not greater than the free travel, the generator-based braking power assumes values which are greater than a predefined percentage of a difference between the maximum generator-based braking power and the neutral generator-based braking power.

23. A non-transitory computer-readable data storage medium storing a computer program having program codes, which is executable on a computer, comprising:
a program code arrangement having program code for predefining a generator-based braking power of an electric machine in a vehicle, by performing the following:
predefining a motor-based propulsion power as a function of the position of a first final control element in the form of an accelerator pedal; and
predefining the generator-based braking power as a function of the position of the first final control element, the generator-based braking power assuming values which are unequal to zero, already at an actuated position of the first final control element;
wherein the generator-based braking power, as a function of the position of the first final control element, only assumes values which are smaller than a neutral generator-based braking power and smaller than a first predefined percentage of a maximum generator-based braking power,
wherein the generator-based braking power is also predefined as a function of the position of a second final control element in the form of a brake pedal, and wherein a friction braking power is predefined with the aid of the brake pedal, and
wherein the generator-based braking power, as a function of the position of the second final control element, only assumes values which are not smaller than the neutral generator-based braking power and not smaller than the first predefined percentage of the maximum generator-based braking power.

24. A control unit of an electric machine, comprising:
a predefining arrangement for predefining a motor-based propulsion power as a function of the position of a first final control element in the form of an accelerator pedal, and for predefining the generator-based braking power as a function of the position of the first final control element, the generator-based braking power assuming values which are unequal to zero, already at an actuated position of the first final control element;

wherein the generator-based braking power, as a function of the position of the first final control element, only assumes values which are smaller than a neutral generator-based braking power and smaller than a first predefined percentage of a maximum generator-based braking power, wherein the generator-based braking power is also predefined as a function of the position of a second final control element in the form of a brake pedal, and wherein a friction braking power is predefined with the aid of the brake pedal, and wherein the generator-based braking power, as a function of the position of the second final control element, only assumes values which are not smaller than the neutral generator-based braking power and not smaller than the first predefined percentage of the maximum generator-based braking power.

* * * * *